United States Patent [19]

Campman

[11] 3,781,842
[45] Dec. 25, 1973

[54] INTRUSION DETECTING APPARATUS AND METHOD

[75] Inventor: James P. Campman, Silver Spring, Md.

[73] Assignee: Vidar Laboratories Inc., Kensington, Md.

[22] Filed: Apr. 27, 1972

[21] Appl. No.: 248,211

[52] U.S. Cl............. 340/258 B, 250/209, 250/221, 340/276
[51] Int. Cl. .......................................... G08b 13/18
[58] Field of Search..................... 340/258 B, 228 S, 340/227 R, 276, 258 A; 250/210 X, 210, 209 X, 209, 221 X, 221

[56] References Cited
UNITED STATES PATENTS
3,444,544 5/1969 Pearson et al.................. 340/258 B
3,594,768 7/1971 Harris et al..................... 340/258 A
3,309,689 3/1967 Keeney............................ 340/258 B Primary Examiner—John W. Caldwell
Assistant Examiner—Glen R. Swann, III
Attorney—Jack H. Linscott

[57] ABSTRACT

An apparatus and a method for detecting motion in a given space, operable to produce an image of said space upon a retina of photoconductive cells, which produce alternating changes in conductivity of the cells and alternating changes in voltage at the output of said cells in response to changes in the image of said space and wherein the alternating voltage changes are processed to select those signals which are attributable to the motion of an intruder in said space, to selectively amplify them, to discard those voltages of low amplitude below a predetermined level, to convert the voltage changes above the predetermined amplitude level into pulses of uniform amplitude and width, to produce a voltage dependent on the pulse rate of said pulses above a predetermined pulse rate for triggering an alarm signal for indicating intrusion.

8 Claims, 10 Drawing Figures

INTRUSION DETECTING APPARATUS AND METHOD

SUMMARY OF INVENTION

The present invention relates to an apparatus that has for its purpose the of viewing a specific area or space, enclosed or unenclosed, to detect the entrance of an intruder, to sound an alarm or provide an indication of the entrance of the intruder, to detect motion in the area or space and to modulate the alarm or indication at a rate determined by the rate of movement of the intruder in the area or space.

There are problems involved in accomplishing such a purpose. One problem is that such apparatus is subject to tampering to render them ineffective in carrying out their purpose. Another problem, and possibly the most worrisome one, is that of false alarms, that constitutes one of the factors of the unreliability of the apparatus. Still another problem arises from dependence on commercial power sources to power the apparatus, the failure of which renders the apparatus ineffective, and the variations of which often results in false alarms.

Such apparatus has been complex and costly to install and maintain and beyond the reach of the average home owner, business man and small widespread operator. As a consequence, the apparatus has not found widwspread acceptance as a deterrent against house breaking and burglary.

One of the chief causes of false alarms have been the entrance upon the space, from the outside, of influences that are normal to the space surrounding the space being monitored. In the particular art to which the present invention belongs, it has been reflections of light patterns that have motion across the monitored area, or the intrusion of a change in light intensity that illuminates a portion of the total area monitored, relative to other portions of the area. This causes signal voltages to be generated in the apparatus, and unless removed, will cause an alarm. Such moving light patterns would be, for example, like those produced by a passing vehicle that either shines its own lights into the monitored space, or causes light to be reflected from the glass or chrome trim. A flashing light that changes the intensity of light on one portion of the area monitored would be exemplified by the outside sign lamps shining through a window viewed by the apparatus, or lightning flashes, or the passing of a cloud that would darken the window. These are but a few of the causes of false alarms.

There have been attempts made in the past, to eliminate the many causes of false alarms, which, while at least partially successful, have introduced other problems.

One such arrangement has been to use infra-red light means to flood the area to be monitored, and making the receiver or detector responsive only to infra-red light. Similarly, artificial light is used and modulated at a predetermined rate or frequency and the detector is tuned to receive the frequency of the illumination. Such methods of overcoming the problem of false alarms have been costly, to install, and to operate and have involved extensive changes in the wiring system. hey also provide a handy means by which the potential intruder might render the detector apparatus inoperative.

The apparatus of the present invention utilizes a power source within the detector apparatus such as a battery, which is more dependable and out of the reach of the potential intruder. To reach it the intruder would cause the alarm to be triggered. The apparatus of the present invention also utilizes the light of the installation, that is, day light when present, or the normal illuminating means during darkness. This elininates the need for the special illuminating means and cost of operation. Further, in the design and arrangements of the sensors of the detector apparatus, consideration is given to the requirement of the installation in which the apparatus is to be used. For example, an installation in a residence would require certain provisions, whereas, an installation in a store building with large front windows would present problems requiring additional or different provisions. Similarly, an area such as a wharehouse and a storage area in an open yard would present different problems and the provisions of different character for their solution.

Many of these differences in requirements can be fulfilled by mere adjustment of a given piece of apparatus. Others would need be met by a different arrangement of the detector sensors in the apparatus, which still falls within the scope of the present invention.

The illustrative example of the invention used in this application pertains chiefly to the kind that would be used in residences, small businesses, offices and the like. It can be used to sound a local alarm, or it can be connected into a monitoring system to alert a centrally located security force whose responsibility it is to investigate. The invention apparatus may be used in conjunction with other security apparatus either to provide greater security or to serve under special circumstances.

One general type of sensor means would provide for detection of motion anywhere in a given area in any direction from the detector apparatus. In other words the sensor means is omnidirectional. This would find use in a large open area as in an outer office, or in an art gallery or museum. Another general type would be one that is directed at specific area within a greater area, as toward a vault or safe, an access means such as a door or gate. Still other uses would be in combination with a telescopic means, as a monitoring means for altering military personel to movement through a given area of enemy troop or vehicles.

As specific areas requiring different provisions are met with, they can be satisfied, generally by one of the general types herein disclosed. This does not preclude the rearrangement of the sensors in such a manner as to satisfy the specific requirements of the new situation. For example, if the installation was for the detection of movement down a hall on one of the floors of a high building from which openings led into several offices, such installation area would be substantially shielded from outside interference, and the access to the area would be limited to the elevator and stairwell. Movement in the area would be more or less restricted into a path in one or two directions from the point of access. By the arrangement of the sensors in the retina movement within the area could be made to produce signals that would by their frequency indicate the speed of movement of the intruder, his direction of movement and approximately the distance that the intruder moved down the hall. By spacing the sensors in the retina with gradually increasing spacing, the signal produced by movement of the intruder would be a variation of frequency indicating the direction of movement.

The length of the pulse train would be an approximate indication of the distance the intruder moved down the hall. Various arrangements of the sensors in the retina can be made to provide different characteristics in the alarm for indication of the nature of the intrusion.

The electronic portion of the detector apparatus of the present invention is designed and arranged to selectively amplify only those signals which would be in the frequency range normally produced by an intruder, sneaking through the area being monitored. Other signals in the output of the sensory means would be attenuated and not amplified to the same extent. From the amplifier, the signals are fed to a unitizer, which produces pulses of uniform energy content for each pulse that is fed thereto from the amplifier. The threshold of the unitizer is such that it eliminates all the noise voltages and low amplitude signal voltages and thus eliminates many of the causes of false alarms. In the unitizer, the amplitude of the pulses is increased and normalized as to the amplitude and pulse width.

Following the unitizer is an energy storage means. Between the unitizer and the energy storage means is a means for regulating the rate of charge of the storage means. Connected to the energy storage means is also a bleed means having a means for regulating the rate of bleed of energy therefrom.

The pulses produced in the unitizer would have only one variable, and that would be the pulse rate or pulse frequency. Thus many of the false alarms can be eliminated by the control over the charging rate and the bleed rate. The level of the energy in the storage means exerts the control over the initiation of the alarm. There are at least three modes of operation that are attributed to the storage means and the bleeder. One such mode of operation would be when the bleed is completely shut off. In this instance, the energy level in the storage means builds up with each input pulse until the alarm is triggered. When the alarm is triggered, a bleed of the storage continues until the alarm is shut off. Another mode of operating is when there is a continual adjusted bleed from the storage means that requires a predetermined pulse frequency at the output of the unitizer for the energy level to reach the triggering level. Once the triggering level is reached, and additional bleed path is opened that causes the storage to be depleated of its charge at a greater rate. The third mode of operation is where there is a continuous alarm once the triggering level is reached followed by a modulation of the alarm when there is continued movement. Still another mode of operation would be produced by bleeding the storage means at a greater rate for all levels of storage above the trigger level and at a slower rate at levels below the triggering level. This latter mode is termed the anticipate mode, wherein the level of energy in the storage means is maintained at or near the triggering level in anticipation of the arrival of another input pulse. This would then cause an instant response of the alarm.

The different modes of operation allow for greater selectivity in the use of the apparatus in obtaining the response that is desired and for the eliminating of false alarms.

The characteristic of the alarm can be determined at the option of the user of the apparatus, by appropriate adjustment in the apparatus. One would be the constant sounding of the alarm after it has once been triggered until the apparatus has been reset. Another would be where the alarm would continue to sound so long as pulses are received, but would be terminated automatically after a predetermined time interval. Still another mode of operation of the alarm would be where it is triggered initially and will sound at a continuous level followed by a modulation of the pitch of the sound in response to the reception of new pulses during the sounding of the alarm.

Through the use of the selective amplification and the processing of the signals, the low amplitude signals are eliminated. Signals generated due to light from lightning discharges would have their high amplitude chopped off and their width normalized in the same manner as any other input pulse, but they would be limited in number and could not by themselves cause a false alarm. Other pulses occuring at a fixed frequency outside the frequency range of the amplifier would be tuned out completely or eliminated at the threshold of the utilizer. The signals caused by moving light patterns across the area being monitored causes signals or pulses at a different rate than those which would be cause by an intruder, and their pulse trains would be much shorter than those that would produced by an intruder moving about in the area. Thus by the proper adjustment of the charge and discharge rates of the storage means these signals can be differentiated to eliminated the effectivenss of the moving light patterns to cause false alarms.

OBJECTS OF INVENTION

It is an object of the invention to provide a low cost intrusion detector system having a high degree of sensitivity and reliability;

Another object of the invention is to provide an intrusion detector apparatus having selective adjustments to enable it to be adapted for the variation in requirement of different installations;

Still another object is to provide an intrusion detector apparatus which will operate substantially as well in periods of low illumination as it will during periods of high illumination.

Another object of the invention is to provide an intrusion detector apparatus that has an alarm that will respond upon the initial occurence of the intrusion with one characteristic sound or indication as for example a continuous tone or lamp brightness and will change to another characteristic while there is movement during the sounding of the alarm as for example the modulation of the alarm tone or the brightness of the lamp.

Other objects of the invention will become obvious as the disclosure proceeds in the specification in reference to the appended drawings in which:

DESCRIPTION OF THE DRAWINGS

FIGS. 6A, 6B, and 6C are schematic views of different portions of the electronic components and circuits for amplifying and processing the sensory signals;

DETAILED DESCRIPTION OF INVENTION

Figure 1:
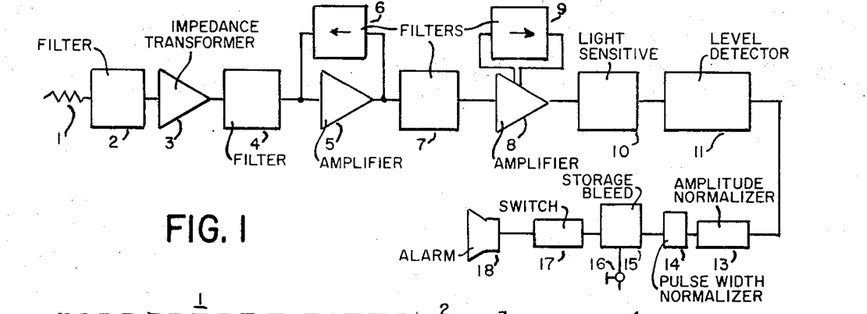
FIG. 1 is a block diagram of the functions performed in the apparatus.

FIG. 1 of the drawing depicts the various functions performed in the detector apparatus in the order in which they are performed.

In the detector means, the changing light intensities and moving light patterns are converted into pulses of voltage varying in amplitude in dependence on changes in intensity on different portions of the sensor. Light changes over the whole area viewed by the sensor will not produce voltage changes at the output of the sensor by reason of the design of the circuit. On the other hand, a light pattern moving across the sensors will produce voltage differences in the sensor circuits that result in a train of pulses being produced at the output of the sensor means. These pulses are coupled through the resistor means 1 to a filter means 2 which operates to pass pulses in a frequency range representative of the movement of the intruder but not frequencies above this range. Such filters provide attenuation for the higher frequencies but little or no attenuation for the lower frequencies. From the filter 2 the signals are fed through an impedance transformer 3, wherein the changing impedance of the detector means due to changes in illumination of the sensor elements can be matched to the impedance of the amplifier. From the impedance matcher 3 the signal passes through another filter 4 that further attenuates the higher frequencies signals. From the filter 4 the signal voltages are passed through a selective amplifier 5 having a low pass filter 6 in its feed back circuit, a filter 7 and a second amplifier 8 having a filter in its feed back circuit at 9. The amplifiers are selective of the signals they amplify to the extent that the filters in the feed back circuits attenuate the higher frequencies of the noise voltages and thus provide an improved signal to noise ratio.

The signals from the amplifier 8 than pass through a light sensitive attenuator 10, which is a means that responds to the ambient light intensity of the field of view of the area monitored, to alter the resistance and voltage drop across a voltage divider, which serves an an input to a level detector 11. The level detector 11 functions to eliminate the low amplitude noise voltages and low amplitude signal voltages and provides for an adjustable threshold level. The low voltage noise and low amplitude signals fail to pass and only those signals that have amplitudes above the threshold value are amplified and passed on the unitizer consisting of an amplitude normalizer 13 and the pulse width normalizer 14. In the unitizer the pulses are reformed or produced that have the same energy content, or are unitized. The unitizer actually responds to the output of the level detector to generate the pulses of uniform energy content, there being a pulse produced for each amplitude peak at the output of the level detector. Any of the signals that are initiated by extraneous causes which escape elimination in the filters, the selective amplifiers, and the threshold level of the input to the level detector will appear as pulses of unit energy content in output of the unitizer. Here the only variables will be the frequency of the pulses, the length of the pulse trains, and the space between the pulse trains.

The energy of the unitizer is fed into a storage means 15 having a means for controlling the rate of charge of the storage means 15 and a means 16 for controlling the rate of bleed of energy from the storage means 15. The level of the energy in the storage means 15 is used as a means for triggering the alarm means 18. Between the storage means and the alarm 18 is a switch means 17 which responds only to a predetermined level of energy in the storage means. Once this level is reached the switch means operates to initiate the alarm.

As previously mentioned, the alarm may be a continuous one until turned off by the user, or until it is automatically turned off after a predetermined period or one that responds to each pulse input to the switch means. The alarm signal may also be modulated to indicate motion in the field of view after the alarm has once been triggered.

The various functions above enumerated will appear with greater clarity from the disclosure of the structure of the detector apparatus that now follows.

Figure 2:
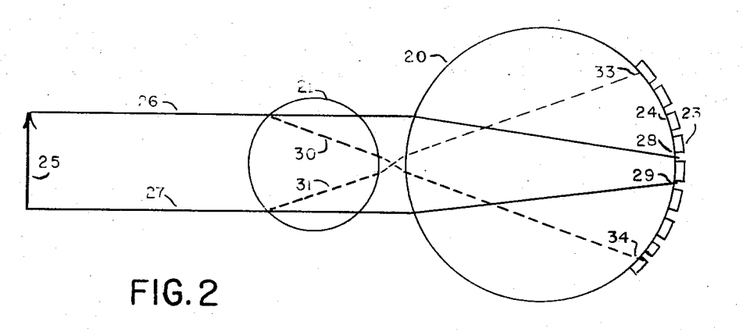
FIG. 2 is a diagram of a lens system illustrating the difference in effect between a single and double lens system.

FIG. 2 of the drawings is a diagram illustrating the difference in effect of one and two lens systems. On one of the lens 20 is mounted an array of photosensors 23 called the retina.

The photoconductive cells 23 are arranged in spaced relation and affixed to the surface of the lens 20. As illustrated in FIG. 2, the photoconductive cells are arranged in an equally spaced relation, one to another, in a direction in which the motion of the image is expected to take place. In the arrangement, the arrow 25 represents the limit of the area in the direction of motion in which the object or intruder is expected to move.

When the object moves either up or down, as seen in FIG. 2, the image will move over the retina of cells, causing the cells to be swept by changing light patterns, thus causing undulations of the resistance of the cells. If it is assumed that the speed of motion of the object is constant in each case, it is obvious that the spacing of the cells will be the sole factor in determining the frequency of the signal that will be produced from the sensory means. As the spacing of the cells is increased, the frequency of the signal would be reduced and as the spacing of the cells is is decreased, the frequency of the signal would be increased. Thus in constructing the sensory means for a given enviromental condition in which the apparatus is expected to be used, the lens means is constructed to provide the proper image size and speed of the image travel over the retina and the cells are spaced to provide proper signal frequencies.

It will be seen that the intruder will have a minimum speed of zero and a maximum speed depending on his capability. Thus, for any given construction of the apparatus, the signal will have a frequency within a range of frequencies depending on the speed of the intruder. The maximum speed of the image will be caused by the maximum speed of the intruder. The maximum frequency of the signal that is produced by the intruder can be limited by the selection of the right spacing for the cells in the retina. Once the spacing is determined, the upper frequency of the signal is set by the capability of the intruder.

In the construction of the apparatus for different enviroments, the changing of the spacing of cells in the retina, changes the frequency of the signal, so that the same electronic apparatus may be used for a wide variation in the lens and retina structures.

The extreme of enviromental conditions would be exemplified on the one hand by an outside storage yard with its great range and area and on the other hand by a room enclosed by walls with its small range and area. In constructing apparatus for the two different enviroments the electronic signal processing means would be identical. Only the lens structure and the spacing of the cells in the retina would be different in the two pieces of apparatus.

FIG. 2 demonstrates the effect of the lens system on the retina. With lens 20 alone, the rays 26, 27 from the object 25 moving parallel enter the lens 20 and are refracted but once, that is, at the point of entry of the lens 20. The rays 26, 27 converge and impinge on the retina 24 at points 28 and 29. Movement of the object 25 either up or down will cause the rays 26, 27 to move down and up relative to the retina thus causing a rather blurred image to be sweeping from one photosensor element 23 to the next. Each time the light intensity changes on one sensor element relative to that on the others in the array, a volt age having an amplitude proportional to the amplitude of change in light intensity is produced at the output of the array.

Assuming that the rays 26, 27 emanate from an object at a greater distance from the lens, it can be seen that the area of the retina upon which the rays impinge is approximately the size of the sensory element and that the whole object would need to be moved to cause the light rays to move from one sensory element to the next, which is a requirement for the production of a detectable voltage difference.

On the other hand, any movement of objects smaller than the previously assumed object. would cause light intensities to change on different portions of the elemental sensor element but the total illumination of the elemental sensor would not change or would remain substantially the same and no voltage change at the output would be produced. Thus, for use in detecting motion of objects of a small size at a greater distance requires another lens means to magnify the image on the retina so that changes due to motion would cause changes in the light pattern to spread over several elemental sensors in the array of the retina.

With the spherical lens 21 interposed between the field of view and the lens 20 there will be a magnification of the image of the field of view on the retina. At the point where the rays 26, 27 impinge on and leave the lens 21 they are illustrated by dashed lines. They converge on the focal point of the lens 21 and diverge towards the lens 20, to be refracted on the entrance of lens 20 to impinge on the retina at points 33 and 34. The mere introduction of the lens 21 into the system has magnified the image of the field of view to encompass substantially the entire retina that is illustrated. Two things occur in this instance, firstly, the image on the retina is brought into sharper focus, providing sharper contrasts, and secondly, the movements of elemental portions of the field of view will be detectable.

For closer fields of view, it will be seen that one lens would be all that would be required. As fields of view are moved closer to the lens, the image on the opposite side of the lens will retreat from the lens. Also, as the image retreats from the lens it becomes larger and the image on the retina becomes more indistinct and spreads over a greater area of the retina. Unlike the eye, the indistinctness of the image on the retina is not so vital in the detection of motion. Sharpness of the image would be productive of sharper signals which in the electronic system to be described would not be of much importance. More important, is the area of the retina subject to the view.

The single lens system in its unshielded installation gathers light from all directions and even from a direction from the side that the retina is located. There is enough light gathered and impinge on the retina through the operation of multiple reflections within the sphere, that motion will be detected outside the direct field of view.

The sensors 24 may be arranged in any particular pattern on the surface of the sphere 20, as required by the needs of the installation in which the detector is to be used. FIG. 2 shows the sensors more or less evenly spaced to form a retina that could be largely influenced by what transpires in a field of view in a direction toward the opposite side of the sphere from which the sensors are located. The sensors may be arranged similar to the rod and cones of the human eye, that is with there being a greater density of sensors to take care of the field of view directly forward of the lens, and with the density of sensors being diminished gradually outward from the center of the retina, that will pick up motion off to the side, thus not depending on multiple reflections for obtaining a wider field of view.

One of the objections of relying on multiple reflections to pick up movement outside the direct field of view, is that the light variations are of smaller intensities and also this light produces a light curtain over the whole retina that hampers the detection of motion even in the direct field of view.

For this reason, it is desirable from the standpoint of sensitivity, to provide light shields for the lens system to exclude light from all directions except from the field of view that is to be monitored. This lifts the curtain of light from the retina, and in effect light biases the sensors to a different point on the response curve. The contrasts of the image on the retina are made sharper because of the removal of the curtain of light and the detector system is made more sensitive as smaller changes in the light pattern are able to be detected. The character of the shielding are many and varied, and would be largely determined by the needs of the installation. Two examples of shield are shown in FIGS. 3 and 4.

Figure 3:
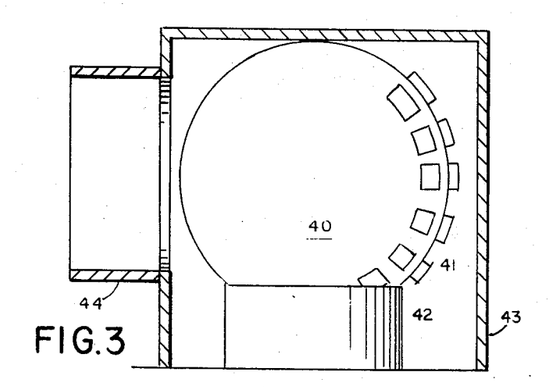
FIG. 3 is an elevational view, partly in section showing one embodiment of the sensor means and a light shield therefor.

In FIG. 3, the shielding cover 23 is arranged to limit the field of view to a given direction from the retina thus excluding light from all direction except from a particular field of view.

Figure 4:
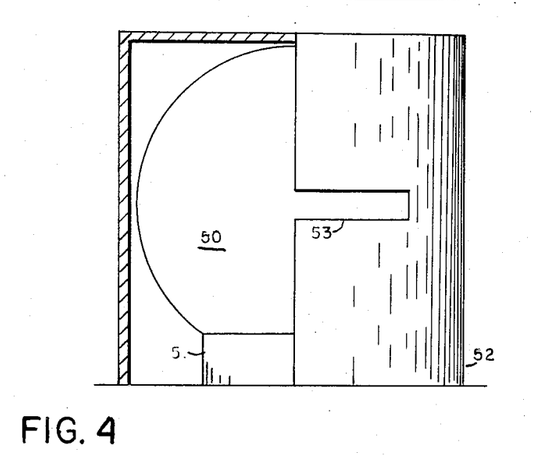
FIG. 4 is an elevational view, partly in section, disclosing another embodiment of the sensor means.

FIG. 4 shows another shield means wherein the field of view is extended in a circumferential direction and restricted in a vertical direction, providing more omnidirectionality with less beclouding light.

Figure 5:
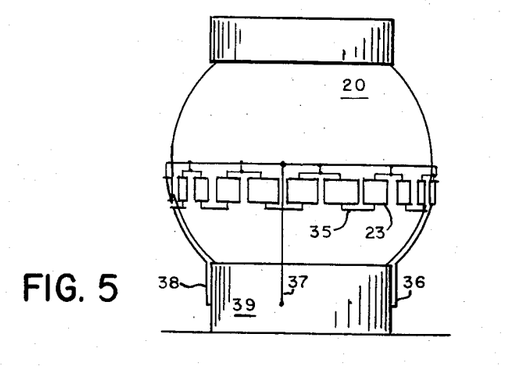
FIG. 5 is still another view in elevation of a sensor means designed for omnidirectional sensing.

FIG. 5 illustrates another embodiment of the detector means having a sphere 20 on which the sensor elements are arranged in spaced relation completely around the lens. The top and bottom of the lens is partially shielded from light and providing a wider field of view in the vertical direction. This type of detector would be suitable for installations such as a room where it is desired to observe movement everywhere in the room, and where the motion would be in a horizontal plane. The arrangement has other advantages in that motion above a certain level would be more or less ineffective thus making it possible to exclude some of the causes of false signals. The sensors 23 are spaced around the periphery of the sphere slightly below the central horizontal plane thereof. They are connected in series parallel arrangement by conductors 35 which lead downward to enter the mounting support 39 at 38, 37, and 36. The shielding at the top and bottom can be varied to suit the requirements of the installation.

There are a wide variation of different designs for the detector to meet the various needs of various installations and it is intended that minor modifications of the arrangement of the sensors on the lens system and modification of the shape and extent of the shield means be embraced within the invention as set forth in the appended claims.

Figure 6A:
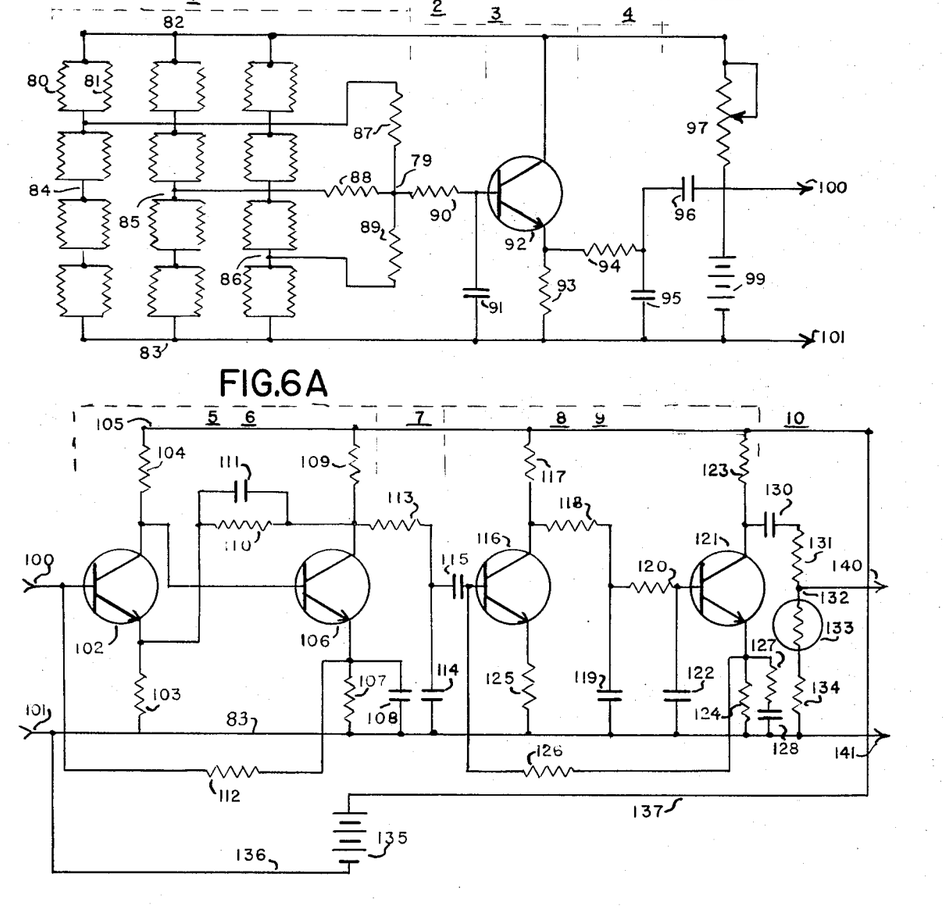

Referring to FIG. 6A, the sensor elements 80, 81 are connected in series parallel array, between the source of voltage, represented by the busses 82, 83.

Each sensor is a photosensitive resistor, having a serpentine deposit of photosensitive material upon a substrate of insulating material. The two portions 80, 81 are connected together on the substrate and from this connection is led an output terminal. As used in the array, the other two terminals of the portions 80, 81 are connected together externally of the substrate, to form the portions 80, 81 as parallel circuits, thus to reduce the impedance over what it would be with a series connection of the portions 80, 81.

The retina of the sensor means is composed of these elements 80, 81, connected in series in three parallel circuits 84, 85, 86, across the source of potential 82, 83. Each of the parallel circuits form a potential divider and as the light pattern changes on the photoresistors, the voltage drops in the divider circuits are redistributed. The parallel circuits are connected respectively through resistors 87, 88, 89 to a common point 79, that functions as a summing connection, producing voltage changes at the point 79 in response to changes in the light pattern over the entire array composing the retina. A uniform change of light intensity over the entire array will not be productive of any change in voltage at point 79, as in that case, all parallel circuits are affected to the same degree and there would be the same distribution of the voltage drops in each parallel circuit as before the change in light intensity. The change in ambient light intensity, that is, intensity of light over the entire retina, does have the effect of changing the source impedance or the impedance of the detector means. The ambient light acts as a light bias, and the intensity thereof determines the operating point in the impedance range. The impedance varies from a low value for high illumination intensities to a high value for low illumination intensities. The range of variations of impedance of the individual sensors is between 52 kilohms and 10 megohms. This wide range of variations is minimized to a degree by the parallel connections of the portions 80, 81 of the individual sensors and by the parallel connection in the array itself. The reduction in the range of impedance variations also results in a reduction in the range of variation of the noise in the detector means, because the noise varies in proportion to the impedance.

The output of the retina is connected from point 79 through resistor 90 and capacitor 91 to ground and from resistor 90 to the base of the impedance transformer transistor 92.

The resistor 90 with the capacitor 91 form a low pass filter circuit, whereby, high frequency components of the output from the retina are by-passed to ground 83, and the low frequency components are directed through the base-emitter circuit of the transistor 92. In such filters there is no sharp cutoff point, instead, the capacitor, which is the frequency responsive element, offers decreasing amounts of impedance as the frequency of the signal is increased. Consequently, additional filters are needed in the processing of the signal to eliminate those components of the signal that are of no interest.

As has been mentioned, the impedance of the source or the detector means varies over a wide range. The transistor 92 is connected at its collector direct to the voltage source 82 and from its emitter through resistor 93 to ground 83. The input impedance of the transistor 92 is high to match the impedance of the source of signals. The impedance of the output of the transistor 92 is relatively lower for the matching with the input of the amplifier stage that follows. Large variations of the source of signals impedance results in a lower variation in the impedance of the output of the transistor 92.

The output from the transistor 92 is connected via resistor 94 and capacitor 95 to ground, forming a second low pass filter, and through coupling capacitor 96 and connector 100 to the base of transistor 102 (FIG. 6B).

The busses 82 and 83 are connected across a series arrangement of a source of voltage, such as battery 99 and a potentiometer 97. This represents a means by which the voltage impressed across the detector means and impedance matching means may be selectively adjusted to suit the needs of particular installations and illumination intensities.

The filters 2 and 4 on each side of the impedance transformer 3 and the impedance transformer are mounted on the detector means or closely adjacent thereto to obtain the best results possible.

In FIG. 6B is disclosed the two selective amplifiers 5 and 8 with a low pass filter 7 interposed between them to add further purification of the signal. The first selective amplifier 5 comprises of two transistors 102 and 106. The base of transistor 102 is fed the input signal through the coupling capacitor 96 (FIG. 6A) and the connector 100. Connectors 100 and 101 provide a means by which different types of detector means may be plugged into the electronic circuitry for the amplification and processing of the signals.

Transistor 102 has its collector connected through load resistor 104 to the source of potential 105 and its emitter connected through bias resistor 103 to ground 83. Transistor 106 has its collector connected to the source of potential 105 through resistor 109, and its emitter connected through resistor 107, and a by-passing capacitor 108 to ground 83. The collector of transistor 102 is connected directly to the base of transistor 106. The collector of transistor 106 is connected through a feedback circuit having a resistor 110 and a capacitor 111 in parallel to the emitter of the transistor 102. The feedback circuit is a filter 6 and it permits the low frequency components of the signal to be fed back to the transistor 102 and attenuates the higher frequency components of the signal, thus making the amplifier selective on a frequency discriminating basis and serve to minimize the noise voltages and the 120 cycle components and frequencies of a higher value.

The emitter of transistor 106 is connected through resistor 112 to the base of transistor 102. This direct current feedback serves to bias transistor 102 acting as a stabilizing means and a temperature compensation means. Capacitor 108 serves to by pass all alternating current voltages to ground.

The output of the first amplifier 5 is coupled to a low pass filter 7 composed of resistor 113 and capacitor 114, which is in turn connected through coupling capacitor 115 to the base of transistor 116 of the second selective amplifier 8 including transistor 116 and transistor 121. Transistor 116 has its collector connected through load resistor 117 to the source of potential 105 and its emitter connected through bias resistor 125 to ground. Transistor 121 has its collector connected through load resistor 123 to the source of potential 105 and its emitter connected through resistor 124 to ground. The collector of transistor 116 is connected to the base of the transistor 121 through a low pass filter circuit 9 composed of resistors 118, 120 and capacitors 119, 122. The emitter of transistor 121 is connected through resistor 126 to the base of transistor 119 and serves as a D.C. bias circuit for the transistor 116. A series circuit composed of resistor 127 and capacitor 128 is connected in shunt across the bias resistor 124. The purpose of the resistor 127 is to lower the gain of the amplifier 8.

The interstage filter 9 consisting of resistors 118, 120 and capacitors 119, 122 operate to prevent the high frequency components of the signal from being fed to the base of the transistor 121. The resistor 127, capacitor 128 operates to control the gain in the amplification of the low frequency components of the signal.

The output from the second amplifier stage is connected through capacitor 130 to a voltage divider consisting of fixed resistor 131, a photo resistor 133 and a fixed resistor 134. The point of connection 132 between the resistor 131 and photoresistor 133 is connected through connector 140, coupling capacitor 146 to the base of transistor 147 (FIG. 6C) forming the input of the level detector 11. The voltage divider, termed automatic light sensitive attenuator 10 operates in response to changes in light level of the field of view of the detector apparatus. At high levels of illumination the photoresistor 133 has a low resistance and at low levels of illumination, the photoresistor 133 has a high resistance. This voltage divider serves to vary the level of the signal fed into the level detector 11 to compensate for the excess noise that is generated during low levels of illumination at the photosensors.

Connectors 140, 141 connect the amplifiers through to the level detector 11, with connector 140 in the base circuit of the transistor 147 and a connector 141 in the ground connection.

The busses 105, 83 are connected to a source of voltage 135 by conductors 136, 137. The arrangement of the different sources of voltage for the different sections of the detector apparatus enables that each section can be supplied with the proper voltage for best operation and also to minimize the possibility of feedback voltages through the busses.

Figure 6C:
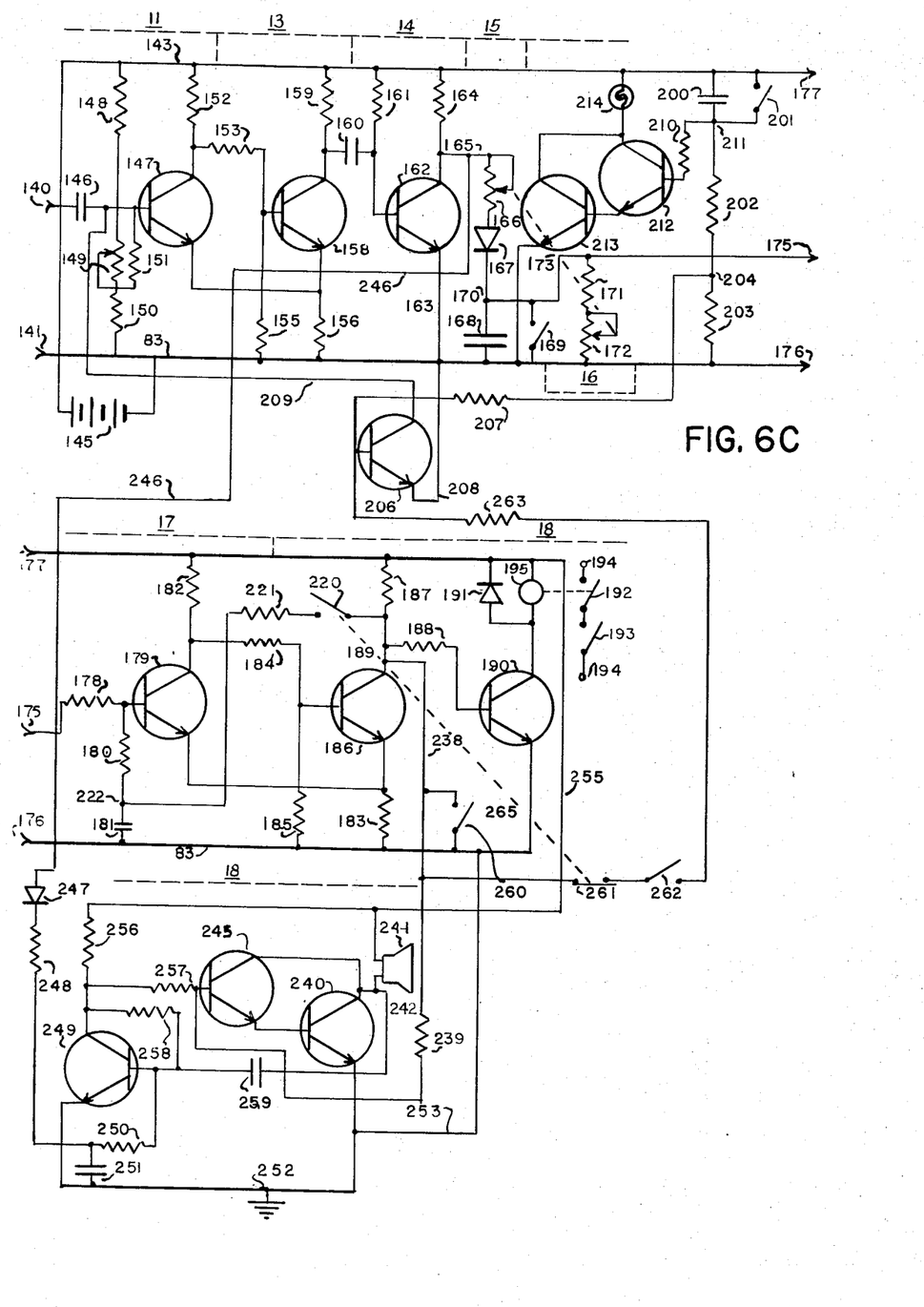

Referring to FIG. 6C, the input to transistor 147 constitutes the level detector means 11. It has its collector connected through load resistor 152 to the source of potential 143 and its emitter connected through resistor 156 to ground 83.

The collector of transistor 147 is further connected through resistor 153 to the base of transistor 158, whose collector is connected through load resistor 159 to the source of potential 143 and its emitter is connected through the biasing resistor 156 to ground 83. The base of transistor 158 is connected to ground 83 through resistor 155. The resistors 152, 153, 155, form a voltage divider across the source of voltage 143, 83, to bias the base of transistor 158. A voltage divider consisting of resistor 148, potentiometer 149 and resistor 150 is connected across the source of voltage 143, 83, and is designed to provide a selectably adjustable source of bias voltage for the base of transistor 147. The potentiometer 149 is connected to the base of transistor 147 through resistor 151, whereby, the threshold of the transistor 147 may be controlled. By use of the potentiometer, the bias may be adjusted to such value that the transistor 147 would only respond to signals having an amplitude of a predetermined level and above. All other signals of lower amplitude would be ineffective in the production of a response of transistor 147.

Transistor 147 in combination with transistor 158 constitutes a Schmidt trigger, wherein transistor 158 is normally conductive by reason of the bias on its base. During this period of conduction of transistor 158, the voltage at its collector is at its lowest value. Transistor 147 is normally nonconductive. When a pulse of such amplitude that exceeds the adjusted threshold of the transistor 147 is transmitted to the base of transistor 147 it becomes conductive and remains conductive for the duration of the pulse that exceeds the threshold value. When transistor 147 becomes conductive, the voltage drop across resistors 152 and 156 is increased, lowering the bias on the base of the transistor 158 and lowering the voltage across the collector-emitter of transistor 158, causing it to become nonconductive. The voltage at the collector of transistor 158 is thus raised from the low value while transistor 158 is conductive to a value of the source 143 when the transistor becomes nonconductive.

When the input voltage to the base of transistor 147 falls below the threshold voltage, the transistor 147 becomes nonconductive, at which time the voltage drop across the resistor 152 is reduced, thus raising the bias on the base of transistor 158 and across the resistor 156, thus increasing the voltage across the collector-emitter of transistor 158. The transistor 158 then becomes conductive. This causes a lowering of the voltage at its collector to its previous low value and the production of a pulse of variable width but of uniform amplitude.

The output from the Schmidt trigger is a pulse that has been amplitude normalized, that is, all pulses from the output of the Schmidt trigger will have the same amplitude. The section is termed a "Pulse Amplitude normalizer."

The output of the pulse amplitude normalizer is connected from the collector of transistor 158 through coupling capacitor 160 to the base of transistor 162. The base is also connected through the resistor 161 to the source of voltage 143. The collector of the transistor 162 is connected through load resistor 164 to the source of voltage 143 and its emitter is connected directly to ground 83.

The transistor 162, with its input circuit is a pulse width normalizer, or in other words, it produces pulses of uniform width and amplitude.

While transistor 158 and 162 are both conductive, there is a voltage drop across the capacitor 160 in a direction from right to left, as viewed in the drawing. This causes the capacitor 160 to becomes charged. When the transistor 158 becomes nonconductive, its collector voltage jumps from its low value to that of the source 143, reversing the voltage drop across the capacitor 160. This causes a voltage pulse of negative character to be transmitted to the base of the transistor 162 and it then becomes nonconductive, producing a jump in the voltage on its collector and the beginning of the positive going pulse. The transistor 162 remains nonconductive until the capacitor 160 acquires sufficient charge in the reverse direction to raise the voltage on the base of transistor 162 to its triggering potential. The time period is constant, depending on the RC constant of the circuit including the capacitor 160 and the resistor 161. When the transistor 162 again become conductive it collector voltage returns to it low value and the pulse is completed.

The combination of the Schmidt trigger and the transistor 162 produces pulses of uniform amplitude and uniform width and is termed a "Pulse Unitizer," because, each pulse so produced will have a voltage of uniform amplitude, which causes a current to flow for a uniform length of time and thus will have the effect of producing uniform energy pulses. The frequency of the pulses will depend on the rate of movement in the field of view of the detector means, the distance between the detector means and the space constituting the field of view, and the spacing of the sensors in the retina of the detector means. At the output of the pulse unitizer the variable factor is the pulse frequency. In one mode of operation where frequency is utilized, there is also the factor of length of pulse trains that is variable. By spacing of the sensors and proper design of the lens system, the detector can be fitted to meet the needs of any particular installation. The frequency of the pulses, due to movement of an intruder in the field of view, can be made to have a definite range and to appear in a predetermined part of the frequency spectrum. By so doing, the signals of interest as those generated by an intruder, can be separated frequency-wise from those which are produced by other influences. As the signals are so separated, it becomes easier to eliminate the causes of false alarms. The length of the pulse trains can also be used to differentiate between those signals caused by an intruder and those signals that are caused by other influences. For example, a pattern of light sweeping across a detector retina due to a passing vehicle would not only produce pulses of a higher frequency than those produced by an intruder in the field of view, but also would produce a pulse train that would be shorter than those produced by an intruder. By making the detector apparatus responsive to specific frequencies and/or length of the pulse trains, would make the detector exclusively responsive to an intruder.

The output of the unitizer is connected from the collector of transistor 162, through a variable resistor 166, and diode 167, to one terminal of a storage capacitor 168. The other terminal of the capacitor 168 is connected to ground 83. Across the capacitor 168 is connected a switch 169, providing means for the discharge of the capacitor 168 and as a means for preventing the arming of the detector apparatus.

Also connected across the capacitor 168 is a bleed circuit having a fixed resistor 171 and a variable resistor 172, whereby, the rate of bleed of the charge on the capacitor 168 can be regulated. The variable resistors 166 and 172 can, if desired, be connected together for simultaneous operation, or they may not be connected, so that they may be separately adjusted, whereby, the energy level within the storage capacitor can be made depending on the pulse frequency, as well as on the length of the pulse trains.

The output of the capacitor 168 is connected through connector 175 and resistor 178 to the base of the transistor 179, which is further connected through resistor 180 and capacitor 181 to ground 83. Capacitor 181 prevents the capacitor 168 from bleeding to ground through the coupling circuit.

The transistor 179 has its collector connected through load resistor 182 to the source of voltage 143 and its emitter connected to ground through resistor 183. The collector of transistor 179 is further connected through resistor 184 to the base of transistor 186 and through resistor 185 to ground 83. The resistors 182, 184 and 185 form a voltage divider across the source of voltage 143, 83 and acts to provide a bias for the base of transistor 186. The transistor 186 has its collector connected through load resistor 187 to the source of voltage 143, and its emitter connected through resistor 183 to ground. The circuit including the transistors 179, 186 is a Schmidt trigger, which is operable as a switch. The transistor 186, in the absence of a signal at the base of transistor 179, will be conductive, producing a low potential on the collector of transistor 186. When the energy level in the capacitor 168 reaches a predetermined level, determined by the threshold of transistor 179, transistor 179 will be triggered into conductivity. This reduces the voltage on its collector and lowers the bias on the base of transistor 186, so that it becomes nonconductive.

The conductivity of the transistor 179 and nonconductivity of transistor 186 continues so long as the pulses of energy fed to the storage capacitor is adequate to maintain the energy level therein above a predetermined level as determined by the threshold of the transistor 179.

The collector of the transistor 186 is connected through resistor 188 to the base of transistor 190, which has its collector connected through a relay solenoid 195 to the source 143 and its emitter connected directly to ground 83. Transistor 190 is rendered conductive when transistor 186 is nonconductive because, at that time there is no current flow in the resistor 186 and the bias voltage of the base of transistor 190 becomes substantially that of its collector. Thus, while transistor 179 conducts, the solenoid 191 is energized. The solenoid 195 is shunted by a diode 191 to discharge the field of the solenoid 195, when the transistor 190 ceases to conduct. The solenoid 195 creates a magnetic field that actuates the contacts 192 in the external circuit which includes switch 193 and terminals 194. The terminals are provided, for the connection of the detector apparatus to an audible or visual alarm at a remote point as for example at a security guard station. It may be connected to an automatic telephone calling system to summon the police of the area.

Switch 193 is provided to render the external circuit inoperative as for example when there is no need for the detector apparatus to alert the security guards.

A local alarm is also provided in the form of a siren 18. A connection for this alarm is made to the collector of transistor 186 via conductor 238, which leads through resistor 239 to the base of transistor 245, having its collector connected through a speaker 241 to the source of voltage 143 and its emitter connected to the base of transistor 240. Transistor 240 is connected with transistor 245, that is, the collector of transistor 245 is connected to collector of transistor 240 and the emitter of transistor 245 is connected to the base of transistor 240.

The local alarm 18 comprises, in addition to transistors 245, 240, a transistor 249 having its collector connected through load resistor 256 to the source of voltage 143 and its emitter connected directly to ground 83. The base of transister 249 is connected through coupling capacitor 259 to the collector of transistor 240. Also, the base of transistor 249 is connected through resistor 258 to its collector, and its collector is connected through resistor 257 to the base of transistor 245.

When the transistor 186 is nonconductive, the voltage of the source 143 is applied through conductor 238 and resistor 239 to the base of transistor 245. This renders transistors 240, 245 conductive and current flows through the speaker causing a change in voltage at collectors of transistor 240, 245. This change in voltage is coupled through the capacitor 259 to the base of transistor 249 that renders it conductive and creates a large voltage drop across the load resistor 256. This drop in voltage is coupled to resistor 257 and through it to the base of transistor 245, that terminates the conductivity of transistors 245, 240. As soon as capacitor 249 transfers the rise in voltage of collector of transistor 240 to the base of transistor 249, it ceases to conduct and the circuitry operates to generate an audio frequency tone in the speaker. This occurs immediately after the alarm circuit is activated indicating intrusion of the area or spaced being monitored.

Movement within the area or space continuing after the alarm has been activated, will cause modulation of the alarm or indicator signal. For this purpose, the unitized pulse output from the transistor 162 is connected by conductor 246, through diode 247, resistor 248 and resistor 250 to the base of transistor 249. A capacitor 251 connects this circuit to ground at a point from between resistors 248 and 250. As the pulses are transmitted from transistor 162 to storage, they are also transmitted to the base of transistor 249, to modulate the output of the oscillator. So long as there is no movement in the area or space monitored, after the alarm has been initiated, the output of the oscillator will be a constant tone. If movement takes place in the area or space while the alarm is activated, the indication will be changed to a modulated tone, or wailing sound. The sharpness of the modulation can be altered by substitution of capacitors of different capacitances for the capacitor 251, or the capacitor may be eliminated.

The apparatus has several different modes of operation which can be effected by adjustment of the controls of the detector apparatus.

For example, one mode of operation is termed the "anticipate mode," which is brought about by an automatic change in the bleed rate from the storage means, in response to the level of energy stored therein. There will be one slow bleed rate for storage levels up to the level at which the alarm is activated and a higher bleed rate for storage levels above the level at which the alarm is activated. The difference in bleed rates provide for interruptions of the alarm if after continued operation of the alarm for a predetermined period there has been no additional pulses of energy fed to the storage means to maintain the storage level. After the alarm ceases to be activated, the bleed rate is reduced to the rate dictated by the setting of the potentiometer 172. This maintains the storage level at or near the triggering level for a longer period of time in anticipation of another pulse input. Also, it is evident that after the alarm is activated that the input of pulses to the storage means will have to be at a greater rate to maintain the alarm activated.

This anticipate mode of operation is obtained by adjustment of the potentiometer 172 in the bleed circuit from storage capacitor 168 to a high resistance setting, thus providing a slow bleed rate so long as the transistor 179 is nonconductive. When transistor 179 becomes conductive, as has been explained, the alarm is activated. Also a new bleed path is created when transistor 179 becomes conductive, that is, through its base-emitter circuit to ground. Thus, while transistor 179 conducts, and while the alarm is activated, the bleed rate is increased by the addition of the new bleed path. As soon as transistor 179 ceases to conduct, the bleed rate then is determined by the setting of the potentiometer 172.

Another mode of operation is controlled by switch 220 connected in a circuit between collector of transistor 186 and the base of transistor 179, which includes resistors 221, 180, and capacitor 181. This is termed the latch mode. With the switch 220 closed and when the level of energy in the storage capacitor reaches the point where transistor 179 becomes conductive, the transistor 186 ceases to conduct and the alarm is activated. The rise in voltage at the collector of transistor 186 is transmitted through switch 220 and resistors 221, 180 to the base of transistor 179, thus maintaining its conductivity and the continual sounding of the alarm. In this instance it makes no difference whether there is other pulses fed to the storage means or not, the alarm will continue to be activated until the switch 220 is again opened. It is possible, during the latch mode, for the alarm, particularly, the local alarm, to be modulated by movement of the intruder within the monitored area.

For the purpose of delaying the arming of the detector apparatus or rendering it ineffective for a short period after it is turned on, a means is provided for grounding the electronic system to prevent the signals during that that period from activating the alarm.

Since the apparatus contains it own power supply and all the controls therefor, it is essential that the arming of the apparatus be delayed for a period necessary to allow the attendant to escape from the area being monitored. For this purpose, a transistor 206 is provided as a switch means for connecting the base of transistor 147 to ground when transistor 206 is rendered conductive. Transistor 106 has its collector connected to the base of transistor 147 by conductor 209 and its emitter connected to ground by conductor 208. The base of transistor 206 is connected through resistor 207 to the junction 204 in a voltage divider containing capacitor 200, and resistors 202 and 203. The capacitor 200 is shunted by a switch 201, which when closed provides a continual flow of current through the resistors 202 and 203. This produces a voltage at point 104, which when applied to the base of the transistor 206 will trigger it into action. When it is triggered into action, the base of the transistor 147 becomes grounded, thus preventing signals from being transmitted beyond the transistor 147. The apparatus is then in the disarmed mode. The apparatus will remain in the disarmed mode until the switch 201 is again opened and remains disarmed until the capacitor 200 becomes charged, thus returning the voltage at the base of the transistor 206 to ground potential.

The closing of switch 169, which shunts the capacitor 168 will prevent the build up of the energy level in the capacitor and also function to render the apparatus inoperative or disarmed.

The transistors 212, 213 have their collectors connected through a lamp 214 to the source of voltage 143. The transistor 212 has its emitter connected to the base of transistor 213 and the emitter of transistor 213 connected to ground 83. The base of transistor 212 is connected through resistor 210 to the junction 211 between capacitor 200 and the resistor 202. This circuitry is merely an indicator of the arming. While the switch 201 is closed the base of the transistor 212 is connected to the source of voltage and it with the transistor 213 is rendered conductive, causing the lamp 214 to light up to its full brilliance, indicating that the apparatus is in the disarmed mode. When switch 210 is opened the lamp 214 remains lighted but the brilliance thereof decreases with the charging of the capacitor 200 until, the voltage at the base of the transistor 212 is reduced to close to ground potential. At that time the lamp 214 is extinguished and the apparatus is then indicated as being armed.

The base of the transistor 206 is also connected through resistor 263 switches 262, 261 to the collector of transistor 186. This circuit is provided for installations wherein there may be large megnetic fields, that might induce voltages in the circuit of the detector apparatus, that would cause the alarm to continue to be activated when once it has been activated. Closure of the switch will apply the collector voltage of the transistor 186 to the base of the transistor 206 to ground the base of the transistor 147 and silence the alarm.

The connectors 175, 176, 177 are shown in lieu of lines to connect the two sections of the electronic circuit that had to be displaced on the sheet of drawing. They are not in the circuitry of the actual structure.

Figures 7, 8:
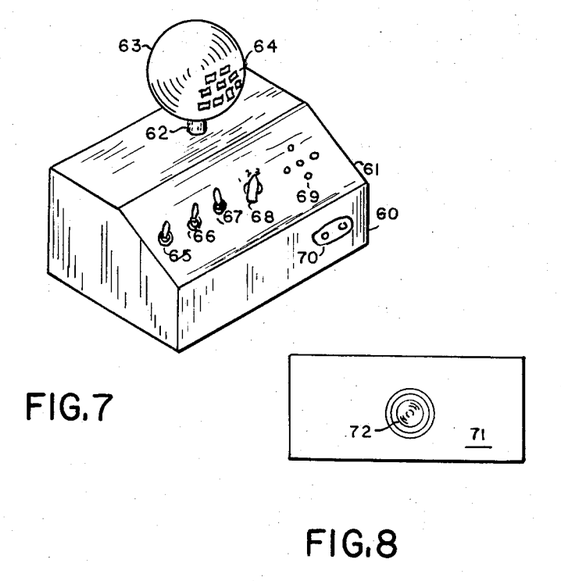
FIG. 7 is a perspective view of the detector apparatus disclosing the cabinet and the sensor means mounted thereon.
FIG. 8 is a partial rear view of the detector apparatus cabinet disclosing the indicator light.

Referring to FIGS. 7 and 8, there is disclosed the cabinet 60 in which the detector apparatus is housed and upon which an unshielded detector means 63 having a retina of photosensors 64 is mounted. The cabinet has a console front upon which are mounted the controls, the local alarm or speaker and the terminal receptacle for connecting the apparatus to a remote alarm or indicator.

The switch operators 65, 66, and 67 are respectively associated with the latch switch 220, the delay arming switch 201 and the remote alarm switch 193. The knob 68 represents the actuator for the bleed control potentiometer 172. The bleed control potentiometer 172 and the charging control potentiometer 166 are represented by broken line 173 as being connected together for simultaneous operation. If desired, a separate control knob may be provided for each of the potentiometers. Switch 261 is illustrated as being connected to switch 220 for simultaneous operation. When switch 220 is closed, switch 261 is opened. Switch 262 has no means external of the cabinet for its control. The speaker or alarm means is located beneath the apertures 69 where through the sound can escape from the interior of the cabinet. The remote alarm circuit, not shown, may be connected to the recepticle 70. On the back side of the cabinet FIG. 8, is mounted the glass lens 72 for the lamp 214 of the arming indicator.

Various other configurations of the cabinet and arrangement of the controls may be made without departing from the spirit of the invention.

The present apparatus as described in the specification and shown in the drawings has many and varied applications from that of use in a residence to detect intruders to the use in business houses, offices, wharehouses, storage yards museums and art galleries. Variation in structure to accomodate the apparatus to the requirements of the various installations may be made without departing from the spirit of the invention as defined by the appended claims.

What I consider to be my invention is set forth in the following claims.

I claim:

1. A method of detecting motion within a predetermined space comprising the steps of:
   projecting a light pattern of said space;
   sensing the changes in said light pattern caused by movement within said space to produce electrical signals in response to said changes, said signals having a frequency below a predetermined frequency level;
   attenuating signals having a frequency above said predetermined frequency level;
   eliminating those signals below the predetermined frequency level having an amplitude below a certain predetermined level;
   amplifying those signals below the predetermined frequency level having an amplitude above said predetermined level
   producing a voltage pulse of uniform energy content for each excursion of the amplified signals above said predetermined amplitude level;
   storing said pulses of uniform energy content to produce a voltage level indicative of the level of energy in storage;
   bleeding energy from storage at a uniform predetermined rate, whereby the voltage level produced is rendered indicative of the rate of pulses fed into storage and
   producing an indication when said voltage level exceeds a predetermined level, whereby to indicate that the light pattern has been changed by movement of an intruder in said space.

2. Apparatus for detecting motion within a predetermined space comprising in combination:
   lens means for projecting a light pattern of said space;
   retina means comprising of spaced photoconductive cells mounted on said lens means for detecting changes in said light pattern due to motion within said space, the spacing of said photoconductive cells being arranged to produce electrical signals having a predetermined frequency in response to the maximum expected rate of motion of an object in the space;

attenuating means for attenuating all other signals having a frequency above the predetermined maximum frequency;

a selective amplifier means for amplifying the signals below said predetermined maximum frequency;

a level detector means to eliminate low amplitude signals and voltages below a predetermined level and for amplifying signals having an amplitude above said predetermined level;

pulse producing means responsive to the output of said detector for producing pulses having uniform energy content;

storage means for receiving said pulses of uniform energy content and for producing a voltage indicative of the number of pulses stored therein;

bleed means for bleeding energy from said storage means at a selective predetermined rate, whereby the voltage of said storage means is rendered indicative of the rate of pulses fed into said storage means;

switch means responsive to a predetermined voltage level at the output of said storage means; and alarm circuit including said switch means having an indicator for indicating when movement takes place in said predetermined space.

3. Apparatus as set forth in claim 2 wherein said indicator comprises;

an audio alarm system initiated by said switch means; and means responsive to the pulses from said pulse producing means, to modulate said audio alarm system at a rate depending on the rate of pulses produced by said pulse producing means.

4. The apparatus as set forth in claim 2, further including:

means activated when said switch means responds to the level of voltage at the output of said storage means for providing an additional bleed path to increase the rate of bleed from said storage means while the switch means is activated.

5. The apparatus as set forth in claim 3, wherein said alarm system is an oscillator for producing an audio frequency tone and wherein said means responsive to pulses produced in said pulse producer is a source of modulating voltages for modulating the output of said oscillator.

6. The apparatus as set forth in claim 2, further including;

a light shield means for partially enclosing said lens means for restricting the space viewed by said lens system to reduce the light level on said retina to that in the image of the space for providing a greater contrast in said light pattern on said retina.

7. The apparatus as set forth in claim 2, wherein said lens comprises;

a sphere; and said retina comprises photoconductive cells near the equator of said sphere to provide for omnidirectional viewing of the space about said detector apparatus.

8. Apparatus as set forth in claim 2 wherein the retina comprises;

a plurality of photoconductive cells arranged in spaced relation to each other, and wherein the spacing is increased in a direction outwardly from a central part of the retina to provide for a change in frequency of the electrical signals in response to direction of change of the light pattern on said retina.

* * * * *